(12) United States Patent
Yan et al.

(10) Patent No.: US 11,061,964 B2
(45) Date of Patent: Jul. 13, 2021

(54) TECHNIQUES FOR PROCESSING RELATIONAL DATA WITH A USER-DEFINED FUNCTION (UDF)

(75) Inventors: Lihua Yan, Mississauga (CA); Zhenrong Li, Mississauga (CA); Ejaz Haider, Markham (CA)

(73) Assignee: Teradata US, Inc., San Diego, CA (US)

( * ) Notice: Subject to any disclaimer, the term of this patent is extended or adjusted under 35 U.S.C. 154(b) by 1158 days.

(21) Appl. No.: 13/430,034

(22) Filed: Mar. 26, 2012

(65) Prior Publication Data

US 2013/0254238 A1 Sep. 26, 2013

(51) Int. Cl.
*G06F 16/90* (2019.01)

(52) U.S. Cl.
CPC .................................. *G06F 16/90* (2019.01)

(58) Field of Classification Search
CPC ......... G06F 17/30917; G06F 17/30501; G06F 17/30607
USPC ......................................... 707/793, E17.045
See application file for complete search history.

(56) References Cited

U.S. PATENT DOCUMENTS

| | | | |
|---|---|---|---|
| 6,006,235 A | 12/1999 | Macdonald et al. | |
| 6,349,305 B1 | 2/2002 | Hara et al. | |
| 6,556,986 B2 | 4/2003 | Hara et al. | |
| 7,106,702 B2 | 9/2006 | Hua et al. | |
| 7,174,553 B1 | 2/2007 | Reed et al. | |
| 7,676,492 B2* | 3/2010 | Bodily | G06F 17/303 707/999.103 |
| 2005/0193264 A1* | 9/2005 | Khan et al. | 714/38 |
| 2007/0271275 A1 | 11/2007 | Fassette et al. | |
| 2009/0082880 A1* | 3/2009 | Saunders | G05B 15/02 700/9 |
| 2009/0313298 A1* | 12/2009 | Koyanagi et al. | 707/103 R |
| 2010/0088350 A1* | 4/2010 | Ahmed et al. | 707/803 |
| 2011/0029551 A1* | 2/2011 | Chen et al. | 707/759 |
| 2011/0161371 A1* | 6/2011 | Thomson | G06F 17/30398 707/792 |
| 2012/0191642 A1* | 7/2012 | George | G06F 17/30448 707/602 |
| 2012/0191732 A1* | 7/2012 | George | 707/755 |

\* cited by examiner

*Primary Examiner* — Kris E Mackes
*Assistant Examiner* — Soheila (Gina) Davanlou
(74) *Attorney, Agent, or Firm* — James Stover

(57) ABSTRACT

Techniques for processing relational data with a user-defined function (UDF) are provided. Relational input data being requested by the UDF, from within a relational database system, is intercepted and normalized. The UDF is called with the normalized input data and as the UDF produces output data in response to the normalized input data that output data is captured and normalized. In an embodiment, the normalized output data is used to dynamically update a data model within the relational database for the input data.

15 Claims, 5 Drawing Sheets

TECHNIQUES FOR PROCESSING RELATIONAL DATA WITH A USER-DEFINED FUNCTION (UDF)

BACKGROUND

After over two-decades of electronic data automation and the improved ability for capturing data from a variety of communication channels and media, even small enterprises find that the enterprise is processing terabytes of data with regularity. Moreover, mining, analysis, and processing of that data have become extremely complex. The average consumer expects electronic transactions to occur flawlessly and with near instant speed. The enterprise that cannot meet expectations of the consumer is quickly out of business in today's highly competitive environment.

Consumers have a plethora of choices for nearly every product and service, and enterprises can be created and up-and-running in the industry it mere days. The competition and the expectations are breathtaking from what existed just a few short years ago.

The industry infrastructure and applications have generally answered the call providing virtualized data centers that give an enterprise an ever-present data center to run and process the enterprise's data. Applications and hardware to support an enterprise can be outsourced and available to the enterprise twenty-four hours a day, seven days a week, and three hundred sixty-five days a year.

As a result, the most important asset of the enterprise has become its data. That is, information gathered about the enterprise's customers, competitors, products, services, financials, business processes, business assets, personnel, service providers, transactions, and the like.

Updating, mining, analyzing, reporting, and accessing the enterprise information can still become problematic because of the sheer volume of this information and because often the information is dispersed over a variety of different file systems, databases, and applications.

Moreover, enterprises are now attempting to integrate data from a variety of different sources having different formats into their enterprise data module. One obvious benefit of such efforts is that an entire 360 degree view of the enterprise data can be achieved with data integration for multiple sources. Such efforts have resulted in fragmented development within the enterprise, where one-off conversion applications and one-off integration applications proliferate, which causes: maintenance, support, and reuse issues for the enterprise. Often times an enterprise developer is unaware of what has already been developed and recreates his/her own version when a particular data integration effort is needed. Further, the amount of programming effort needed for integration remains constant within the enterprise despite the substantial increase in integration activities within the enterprise.

SUMMARY

In various embodiments, techniques for processing relational data with a User-Defined Function (UDF) are presented. According to an embodiment, a method for processing relational data with a UDF is provided.

Specifically, a data model is acquired for input data that is to be used in the processing of a user-defined function (UDF) from within a relational database system and the input data housed in a relational database. The input data is normalized and the UDF is initiated within the relational database system for performing custom-user defined calculations using the normalized data. Next, output data produced from the UDF is normalized into a normalized output format and the original data model, within the relational database system, is updated based on the mapped output data in the normalized output format.

DETAILED DESCRIPTION

Figure 1A:
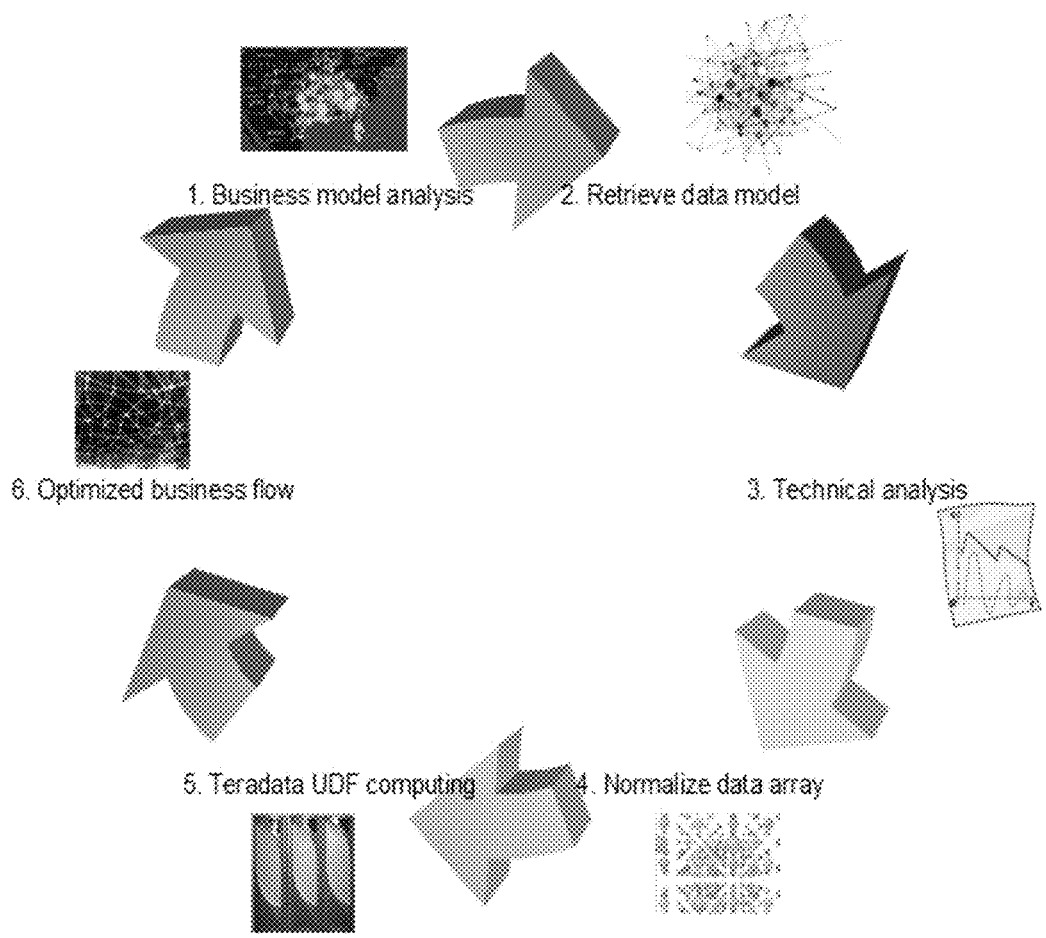
FIG. 1A is a diagram depicting an architecture for processing relational data with a UDF, according to a specific embodiment.

FIG. 1A is a diagram depicting an architecture for processing relational data with a UDF, according to a specific embodiment. It is noted that the components of the architecture are implemented, programmed, and reside within a non-transitory computer-readable storage medium and process on one or more processors of a network. The network wired, wireless, or a combination of wired and wireless.

Figure 1B:
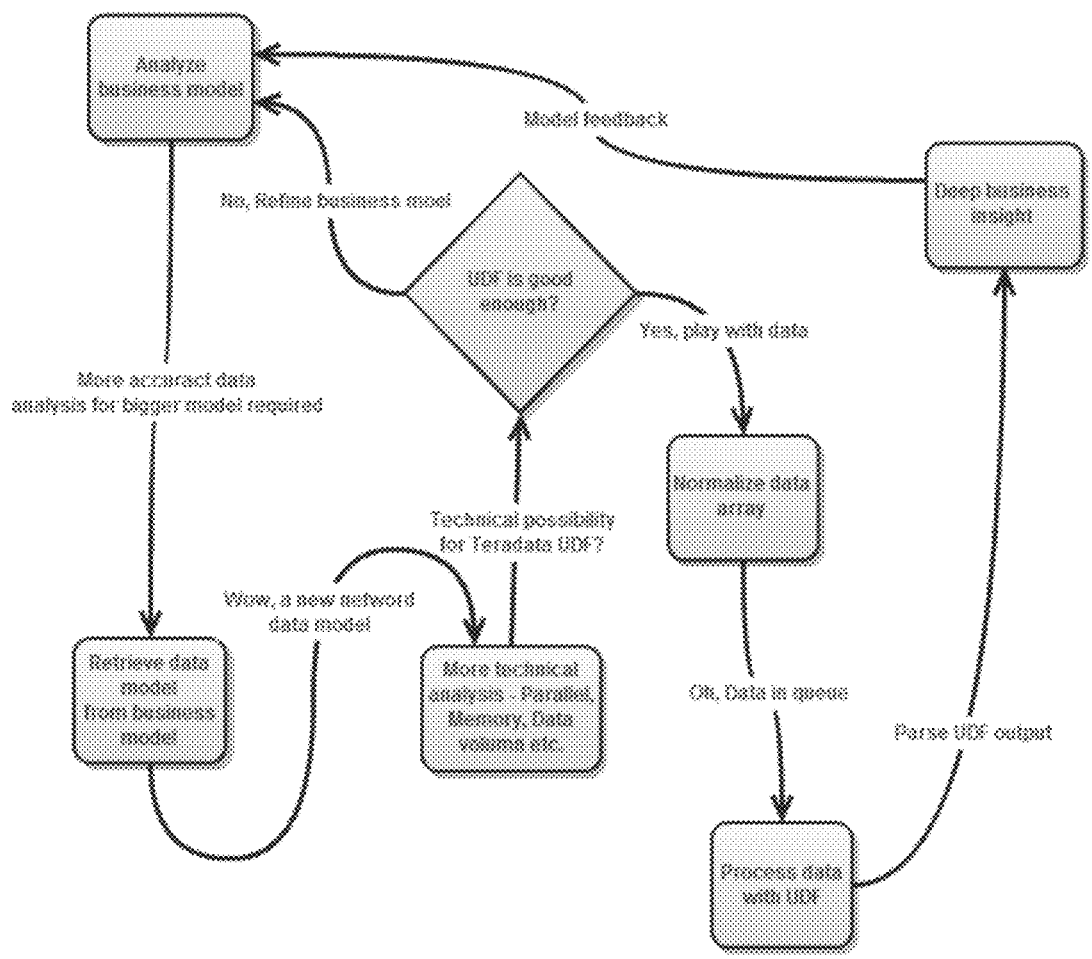
FIG. 1B is a flow diagram for components of the architecture presented in the FIG. 1A, according to an example embodiment.

The architecture is presented from the perspective of a large relational database installation, such as Teradata®, distributed by Teradata, Inc. of Miamisburg, Ohio. Although, the FIGS. 1A and 1B are presented and described within the context of the Teradata® product it is to be noted that any relational database product or Application Programming Interface for a relational database product can be enhanced to include the beneficial teachings presented herein and below.

As initial context for the discussion that follows, it is noted that the phrase "supercomputing" refers to performing processor and memory-intensive operations. Moreover, the phrase "big data" refers to using voluminous amounts of data with the process processor and memory-intensive operations. Conventionally, even with existing large relational database installations, when there was a need to perform supercomputing on big data, the data was exported and separate systems were used for the calculations. This approach is manually intensive, time consuming, fraught with errors, and costly for enterprises.

As discussed herein with the various presented embodiments, supercomputing for big data takes place in a manner that is seamlessly integrated in an automated fashion into the existing relational database API's to permit the supercomputing to occur via a UDF (referred to in some instances here as an "extreme UDF."

Supercomputing for big data with an extreme UDF is an approach to turn a relational database platform (such as, by way of example, a Teradata® database) into a supercomputing machine. The approaches presented combine data calculation and data storage into one system via a UDF to eliminate the overhead of big data input and output. Based on a relational database's scalable structure, a database gains much better performance for big data computing then other architectures or platforms. So, with this presented approach, the relational database is able to finish huge amounts of computing, which was only possible on super computer in the industry before the novel techniques presented herein.

Again, supercomputing for big data with extreme UDFs delivers a solution to complete supercomputing calculations on huge amounts of data in a relational database.

Specifically, with more and more data aggregation occurring within the industry, more industry needs have already been identified such as:

ability to integrate intelligence and more accurate data analysis into relational data;

ability to handle complex and dynamic data models being introduced into an enterprise's data warehouse; and ability to update and acquire the most up-to-date data being transferred into the data model on a continuous basis.

To address the above requirements, traditional technology has encountered the following bottlenecks, insurmountable heretofore:

time consumption needed for retrieving and storing a large amount of relational data;

handling existing fragile data models having complex dynamic algorithms; and lack of inexpensive computing resources needed for supercomputing calculations.

As will be shown more completely herein and below, supercomputing for big data with extreme UDFs is able to seamlessly implement complex business analysis under an existing data warehouse (relational database) architecture. The presented approach is a high performance computing solution to support complicated dynamic application models, which could only be run in super computers previously. The combination between the relational database architecture and an extreme UDF removes the bottlenecks (identified above) for retrieving and storing data; this was not avoidable among other approaches in the industry.

Moreover, the supercomputing for big data with extreme UDF provides an integrated single implementation model to resolve complex business requirements.

The following described components represent the overall process of the supercomputing for big data with an extreme UDF.

The supercomputing for big data with an extreme UDF is a relational database application model. It's programmed as a relational database's UDF and accessible as a stored procedure. The tool (supercomputing for big data written as a UDF) can be used to expand existing product functionality for the relational database architecture.

Now with reference to the architecture and processing discussed in the FIG. 1A.

There are 6 processing steps.
1. Business model analysis.
Analyze current business flow, detect deep relationships among business units and create a business network model.
2. Retrieve data model.
Convert business network model into a data model and verify complexity of hat data model.
3. Technical analysis.
Analyze converted data model, clarify the possibility of parallel processing, memory usage, input and output data volume.
4. Normalize data array.
Normalize input data into data array and put various data types into one fixed common structure.
5. UDF computing.
Invoke UDF to process algorithm computing—input with data array and output with data array.
6. Optimized data flow.
Apply UDF output to refine the business processes.

To implement this application model as shown in the FIG. 1A, it is noted that:
1. Parallel model. Model is capable of being split into multiple groups for parallel processing.
2. Memory usage. Application Module Processor (AMP) memory can be limited, such as by 32M bytes. The model memory is monitored so as to not exceed the existing relational database's architecture's memory limit.
3. Data array. Input/Output data can be reloaded by the array format.

FIG. 1B is a flow diagram for components of the architecture presented in the FIG. 1A, according to an example embodiment. The components are implemented, programmed, and reside within a non-transitory computer-readable storage medium for execution on one or more processors of a network. The network is wired, wireless, or a combination of wired and wireless. Again, although the FIG. 1B shows the Teradata® data warehouse product offering (discussed above with reference to the FIG. 1A), it is to be noted that any relational database product offering or relational database API can be enhanced to include the teachings presented herein.

Each of the processing steps and the flow for the interaction of the components is descriptively presented in the FIG. 1B. Before any UDF is processed for supercomputing big data, a check is made to see if processing such UDF is feasible within the physical restrictions of the underlying relational database platform. It is noted, that this check is done even when the UDF is modified for supercomputing dig data. Once it is known that the physical limitations for the relational database are complied with, the UDF is analyzed to see if the UDF presented is in shape for supercomputing big data and if it is then the input and output data array is normalized, placed in the processing queue, and executed on the relational database platform to provide deep insight into the business model. When the UDF being analyzed is not in shape for supercomputing big data, it is analyzed and an appropriate data model from the business models available is selected.

Figure 2:
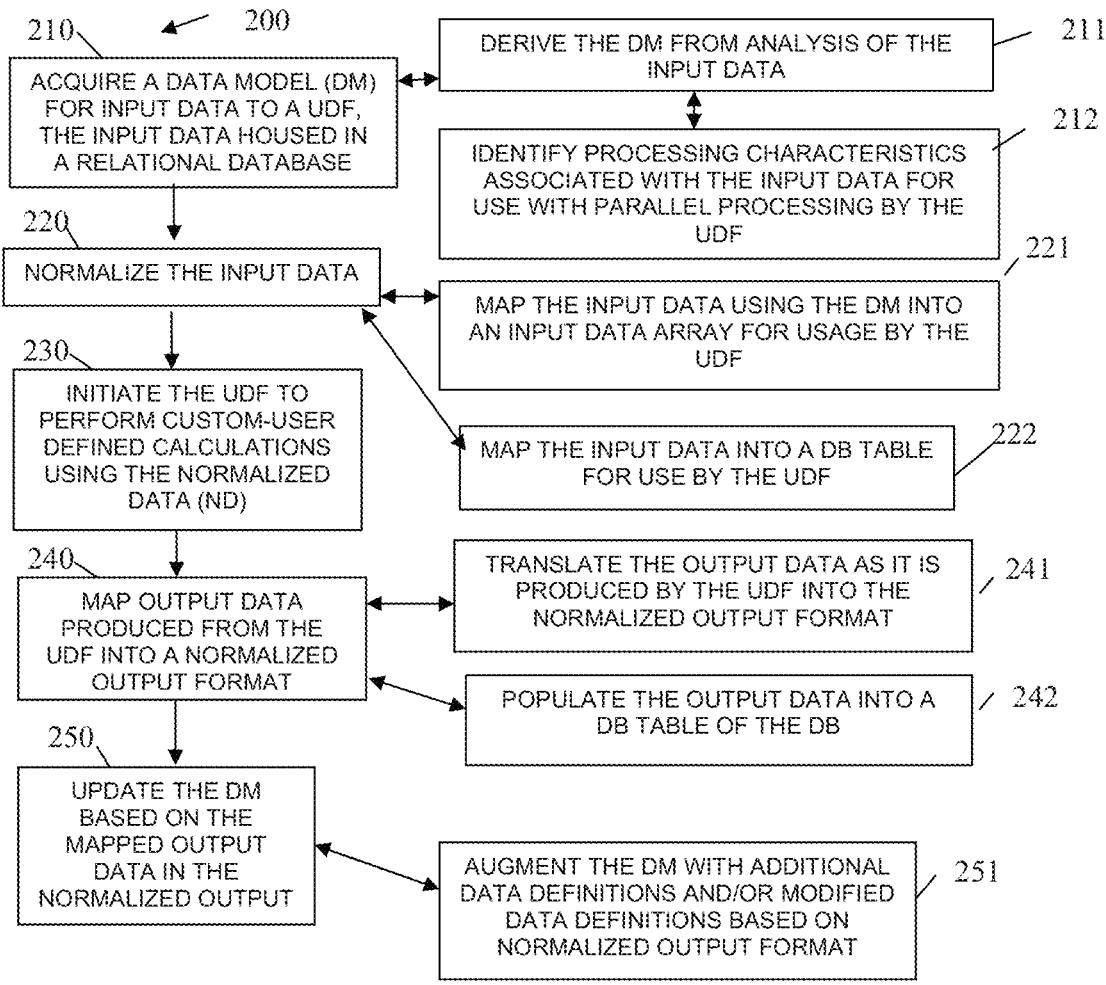
FIG. 2 is a diagram of a method for processing relational data with a UDF, according to an example embodiment.

FIG. 2 is a diagram of a method 200 for processing relational data with a UDF, according to an example embodiment. The method 200 (hereinafter referred to as "UDF integrator") is implemented, programmed, and resides within a non-transitory computer-readable storage medium for execution on one or more processors of a network that are specifically configured to execute the UDF integrator). The network can be wired, wireless, or a combination of wired and wireless.

The UDF integrator is implemented and integrated into a relational database product offering, such as the Teradata® product distributed by Teradata, Inc. of Miamisburg, Ohio. It is noted that the UDF integrator can be integrated to enhance any relational database product offering and/or relational database API. Moreover, the architecture of the processing environment for the UDF integrator and the relational database product offering is a parallel processing environment permit the UDF's (discussed herein) to be processed using parallel processing techniques.

At 210, the UDF integrator acquires a data model for input data. The input data is being directed to a UDF. That is, the processing of the UDF integrator occurs within an existing relational database system as does a user-defined and customized UDF. That UDF at some point in time requests input data from an API of the relational database or is known to request input data of s certain type or defined by certain conditions. The UDF integrator acquires the data in advance of the request by the UDF. The data model defines the format, attributes, and characteristics of the input data. In one case, the data model is a table schema defined in the database.

According to an embodiment, at 211, the UDF integrator automatically and dynamically derives the data model from analyzing the input data. For example, at 212, the UDF integrator identifies processing characteristics associated with the input data for use with parallel processing performed by the UDF. Some example processing characteristics can include, but are not limited to, such things as data ranges for a given data type, byte sizes of fields defined within the input data, data types defined within the input data, and the like.

At 220, the UDF integrator normalizes the input data. Here, the format defined by the data model for the input data is translated or converted into equivalent data having a normalized format. So, some data fields can be combined into one field, the size and types of fields can be altered, and the like.

In an embodiment, at 221, the UDF integrator maps the input data using the data model into an input data array for usage by the UDF. For example and in an embodiment, the mapping converts the multi-structured input data into a two-dimension data stream array that can be directly applied and used by the UDF defined by the user. As one case, consider the dimension of the two-dimensional (2D) array is M×N where M is the width (column data) and N is the height (row data). It is noted that M (width) does not have to equal N (height). M may be a pre-defined data format having a fixed length. N can have a variable length. The row (N) may be defined as 1) Row 1-Row X, common data model; 2) Row X+1-Row N−1, specified unit data; and 3) Row N, ending flag. Each data cell in the data array can be any relational database type. To support multi-structured data a variable byte structure can be used to aggregated structured data in the input data into data chunks).

In another scenario, at 222, the UDF integrator maps the input data into a database table for use by the UDF. So, if the UDF expects a table as input having a predefined format, the UDF integrator normalizes the input data to conform to the format of the table and populates the table with the normalized input data.

At 230, the UDF integrator initiates the UDF to perform custom-user defined calculations using the normalized data. Here, the UDF performs supercomputing against the input data. Essentially, process-intensive operations using a lot of memory and operating against the input data, which is voluminous. So, operations that traditionally could not process for a variety of processing limitations can take advantage of the parallel processing structure of a relational database system and process as a UDF in a seamless manner by having the relational input data transformed into expected input, via the normalized input data and then the UDF is initiated and executed within the relational database system using the hardware resources, the execution environment, and software resources of the relational database system.

At 240, the UDF integrator maps the output data produced from the UDF into a normalized output format. So, similar to the normalization of the relational data to an input format conversion, the output data produced by the UDF is also normalized into a relational database format that makes it usable by other processes within the relational database system.

According to an embodiment, at 241, the UDF integrator translates the output data as it is produced by the UDF into the normalized output format. So, the normalization of the output data can be done in-stream and as the output data is being generated and outputted by the UDF. It is noted that other situations can exists as well, such as batch processing the output data once the UDF completes processing of the normalized input data.

Similar to the embodiment of 222, and at 242, the UDF integrator can also populate the normalized output data into a database table of the database for use by other processes related or not related to the UDF.

Finally, at 250, the UDF integrator updates the data model based on the mapped output in the normalized format. In other words, the original data model that defines the input data can be updated or enhanced based on the normalized output data produced by the UDF.

In this way, a dynamic feedback loop can be instituted within the relational database system that permits existing data models to be continuously improved for data quality and/or data processing improvements.

It is also noted that the processing of the UDF integrator permits existing supercomputing applications or high-intensity processing/memory applications to be integrated within existing relational database systems to utilize the infrastructure of the database systems and the parallel processing capabilities and resources of those systems.

Figure 3:
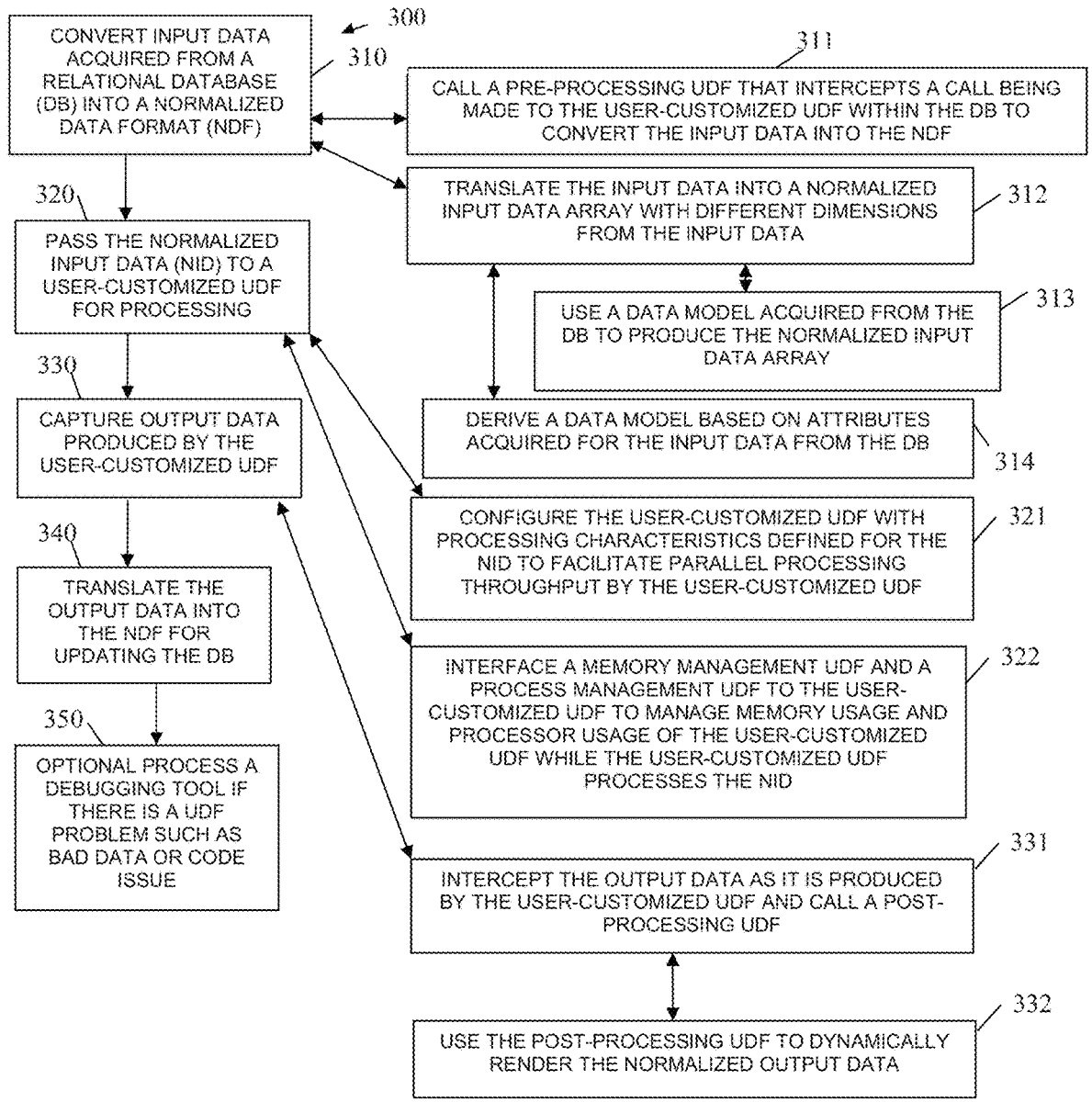
FIG. 3 is a diagram of another method for processing relational data with a UDF, according to an example embodiment.

FIG. 3 is a diagram of another method 300 for processing relational data with a UDF, according to an example embodiment. The method 300 (hereinafter referred to as "UDF manager") is implemented, programmed, and resides within a non-transitory computer-readable storage medium for execution on one or more processors of a network that are specifically configured to execute the UDF integrator). The network can be wired, wireless, or a combination of wired and wireless.

The UDF manager presents another and in some instances an enhanced perspective of the UDF integrator (presented in detail above with reference to the FIG. 2).

At 310, the UDF manager converts input data acquired from a relational database into a normalized data format. The exact format of the normalized data can be custom-defined or even defined based on automated rules that are evaluated dynamically and in real time to translate the initial input data into a defined normalized format.

According to an embodiment, at 311, the UDF manager calls a pre-processing UDF that intercepts a call being made to a user-customized UDF within the database for purposes of converting the input data into the normalized data format. So, a generic UDF can be used as a form of a transparent proxy within the database system that detects based on an identifier for the user-customized UDF a call being made to the user-customized UDF where the generic pre-processing UDF intercepts the call and automatically converts the input data from the existing relational database format into a normalized data format that is being expected by the user-customized UDF.

In one scenario, at 312, the UDF manager translates the input data into a normalized input data array with different dimensions from that which was defined in the input data. An example of how to achieve this was discussed above with reference to the FIG. 1 where multi-structured and dimensional relational data is normalized into a 2D data input array.

Continuing with the embodiment of 312 and at 313, the UDF manager uses a data model acquired from the database to produce the normalized input data array. This can include such things as a table schema being used by the database for the input data.

In another case of 312 and at 314, the UDF manager derives the data model dynamically based on attributes acquired for the input data from the database. So, the schema can be dynamically derived based on analysis of the input data and statistics associated with the input data as carried by the database.

At 320, the UDF manager passes the normalized input data to a user-customized UDF for processing. Again, this can be a supercomputing application that originally was incompatible with processing within an existing Application Programming Interface (API) associated with the database. So, the UDF can be a legacy application that is being dynamically integrated within the database using existing API's of the database, via the novel processing associated with the UDF manager.

According to an embodiment, at 321, the UDF manager configures the user-customized UDF with processing characteristics defined for the normalized input data for purposes of facilitating parallel processing throughput by the user-customized UDF. In other words, processing logic for handling memory and parallel processing can be configured into aspects of the user-customized UDF.

In one situation, at 322, the UDF manager interfaces a memory management UDF and a processing management UDF to the user-customized UDF for purposes of managing memory usage and processor usage of the user-customized UDF while the user-customized UDF processes the normalized input data. So, the processing environment that executes the user-customized UDF can be configured to watch for events and processing to call the memory management UDF and the processing management UDF. In this way, a legacy user-customized UDF can be interfaced with the memory and processing UDFs without changes to the user-customized UDF. In other cases, slight modifications to include files or to processing logic to the user-customized UDF can be made to achieve the interface between the user-customized UDF and the memory and processing UDFs.

At 330, the UDF manager captures output data produced by the user-customized UDF for purposes of normalizing that output to a usable relational database format.

In an embodiment, at 331, the UDF manager intercepts the output data as it is produced (being streamed) by the user-customized UDF and the UDF manager makes a call to a post-processing UDF. Similar to the processing above at 311, the output normalization for output data produced by the user-customized UDF can be achieved via a transparent proxy like post-processing UDF. Again, and in one case, at 332, the UDF manager uses the post-processing UDF to dynamically render the normalized output data.

At 340, the UDF manager translates the output data into a normalized data format for updating to the database. This makes the output available by other processes, related or unrelated to the user-customized UDF.

According to an embodiment, at 350, the UDF manager processes a debug tool to debug the processing associated with the UDF manager and the user-customized UDF. This debug tool may itself be a UDF with debugging mode or a UDF simulator.

In this manner, each aspect of the UDF manager can be provided as one or more specific UDFs that integrated into an existing relational database system. By using the UDF API mechanism of an existing relational database system, user-provided supercomputing applications can be integrated into the processing environment of the existing relational database and data consumed by such applications can be acquired from the database and the data produced by such application integrated back into the database system for usage by other applications of the database system. This integration is achieved with minimal effort and in manners that are seamless to the database system and the existing supercomputing applications.

Figure 4:
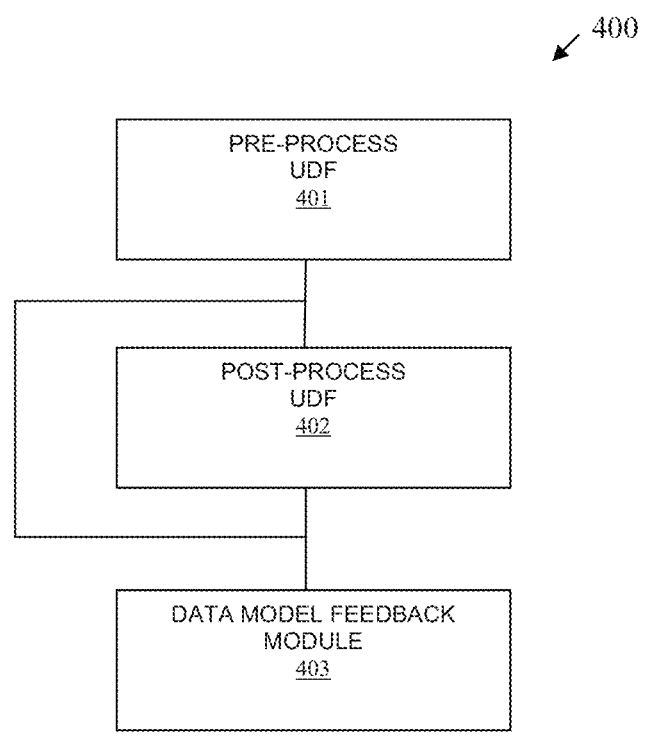
FIG. 4 is a diagram of UDF processing system, according to an example embodiment.

FIG. 4 is a diagram of UDF processing system 400, according to an example embodiment. The UDF processing system 400 components are implemented, programmed, and reside within a non-transitory computer-readable storage medium and are executed on one or more processors of a network. The network is wired, wireless, or a combination of wired and wireless.

In an embodiment, the UDF processing system 400 implements, inter alia, the various aspects of the FIGS. 1A, 1B, and 2-3 presented above.

The UDF processing system 400 includes a pre-process UDF 401 and a post-process UDF 402. In some embodiments, the UDF processing system 400 also includes a data model feedback module 403. Each of these components and the interaction between the components will now be discussed in turn.

The UDF processing system 400 includes one or more processors operational over a network. The processors include a pre-process UDF 401 that is implemented, programmed, and reside within a non-transitory computer-readable storage medium for execution on the one or more processors. Example processing associated with the pre-process UDF 401 was presented above with reference to the FIGS. 2 and 3.

The pre-process UDF 401 is configured to intercept calls made by a user-customized (can be a legacy UDF) to normalize input data being acquired by the user-customized UDF from a parallel processing relational database management system (DBMS). The pre-process UDF 401 provides the normalized input data to the user-customized UDF for processing within the DBMS.

The processors also include a post-process UDF 402 that is implemented, programmed, and reside within a non-transitory computer-readable storage medium for execution on the one or more processors. Example processing associated with the post-process UDF 402 was presented above with reference to the FIGS. 2 and 3.

The post-process UDF 402 is configured to intercept output data produced by the user-customized UDF and translate the output data into a normalized output data. The normalized output data can then be used and made available through the DBMS to other applications and services of the DBMS via existing APIs of the DBMS.

In an embodiment, the processors also include a data model feedback module 402 that is implemented, programmed, and reside within a non-transitory computer-readable storage medium for execution on the one or more processors. Example processing associated with the data model feedback module 402 was presented above with reference to the FIG. 2.

The data model feedback module 402 is configured to dynamically update a data model that defines the input data based on the normalized output data. The data model feedback module 402 may itself be implemented as a UDF within the DBMS.

Now that it has been demonstrated how processing, such as super-computing techniques, is achieved on relational data using a UDF, a sample implementation and source code for one aspect of such an implementation on one or more processors of a network-based system is presented. The implementation resides and is programmed within a non-transitory computer-readable storage medium and compiled as executable code that the one or more processors are configured to execute. It is noted that the source code is but one implementation that can be achieved with the techniques presented herein.

The sample source-code implementation for a UDF build phrase of multiple row input and output that supports large relational data is as follows:

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a relational database system and processed by one or more processors, the processors configured to execute the method, comprising:
   acquiring a data model and input data from said relational database system, the input data housed in a relational database maintained within said relational database system, said data model defining format, attributes, and characteristics of said input data;
   normalizing the input data by combining at least some fields associated with the input data into a single field in the normalized input data and by altering a size and a type of at least some other fields associated with the input data in the normalized input data;
   initiating a user defined function (UDF) to perform custom-user defined calculations using the normalized data;
   mapping output data produced from the UDF into a normalized output format;
   generating an updated data model based on the mapped output data in the normalized output format; and
   replacing said data model within said relational database system with said updated data model.

2. The method of claim 1, wherein normalizing further includes mapping the input data using the data model into an input data array for usage by the UDF.

3. The method of claim 1, wherein normalizing further includes mapping the input data into a database table for use by the UDF.

4. The method of claim 1, wherein mapping further includes translating the output data as it is produced by the UDF into the normalized output format.

5. The method of claim 1, wherein mapping further includes populating the output data into a database table of the relational database.

6. The method of claim 1, wherein updating further includes augmenting the data model with additional data definitions and/or modified data definitions based on normalized output format.

7. A method implemented and programmed within a relational database system and processed by one or more processors, the processors configured to execute the method, comprising:
   acquiring a data model and input data from said relational database system, the input data housed in a relational database maintained within said relational database system, said data model defining format, attributes, and characteristics of said input data;
   converting the input data acquired from said relational database into a normalized data format by combining at least some fields associated with the input data into a single field in the normalized input data and by altering a size and a type of at least some other fields associated with the input data in the normalized input data;
   passing the normalized input data to a user-customized user-defined function (UDF) for processing;
   capturing output data produced by the user-customized UDF;
   translating the output data into the normalized data format;
   generating an updated data model based on the translated output data in the normalized output format; and
   replacing said data model within said relational database system with said updated data model.

8. The method of claim 7 further comprising, processing a debugging tool debug the method.

9. The method of claim 7, wherein converting further includes calling a pre-processing UDF that intercepts a call being made to the user-customized UDF within the relational database to convert the input data into the normalized data format.

10. The method of claim 7, wherein converting further includes translating the input data into a normalized input data array with different dimensions from the input data.

11. The method of claim 7, wherein passing further includes configuring the user-customized UDF with processing characteristics defined for the normalized input data to facilitate parallel processing throughput by the user-customized UDF.

12. The method of claim 7, wherein passing further includes interfacing a memory management UDF and a process management UDF to the user-customized UDF to manage memory usage and processor usage of the user-customized UDF while the user-customized UDF processes the normalized input data.

13. The method of claim 7, wherein capturing further includes intercepting the output data as it is produced by the user-customized UDF and calling a post-processing UDF.

14. The method of claim 13, wherein translating further includes using the post-processing UDF to dynamically render the normalized output data.

15. A system, comprising:
   one or more processors of a parallel database management system (DBMS) configured with a pre-process user-defined function (UDF) and a post-process UDF, the pre-process UDF and the post-process UDF implemented, programmed, and resides within a non-transitory computer-readable storage medium that execute on the one or more processors;
   wherein the pre-process UDF is configured to intercept calls made to a user-customized UDF to normalize input data being acquired by the user-customized UDF from a relational database maintained within the DBMS and configured to provide the normalized input data to the user-customized UDF for processing within the DBMS, the post-process UDF configured to intercept output data produced by the user-customized UDF and translate the output data to normalized output data, and wherein the pre-process UDF is configured when normalizing the input data to combine at least some fields associated with the input data into a single field in the normalized input data and by altering a size and a type of at least some other fields associated with the input data in the normalized input data; and
   a data model feedback module implemented, programmed, and residing within a non-transitory computer-readable storage medium and for execution on the one or more processors, the data model feedback module configured to dynamically update a data model acquired from said DBMS, said data model defining format, attributes, and characteristics of the input data housed within said relational database.

\* \* \* \* \*